(12) United States Patent
Suzuki et al.

(10) Patent No.: US 6,239,836 B1
(45) Date of Patent: May 29, 2001

(54) CAMERA CONTROL SYSTEM WITH RESTRAIN BASED ON THE NUMBER OF CLIENTS HAVING ACCESS

(75) Inventors: Kazuko Suzuki; Tomoaki Kawai; Koichiro Tanaka, all of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/974,212

(22) Filed: Nov. 19, 1997

(30) Foreign Application Priority Data

Nov. 29, 1996 (JP) .................................................... 8-319893

(51) Int. Cl.⁷ ............................... H04N 5/232; H04N 7/14
(52) U.S. Cl. ................... 348/211; 348/14.03; 348/14.05; 348/333.02; 348/552; 345/327; 709/204; 725/116
(58) Field of Search ............................ 348/14.01, 14.03, 348/14.05, 14.07, 14.08, 14.09, 135, 143, 207, 211, 212, 213, 222, 333.01, 333.02, 552; 345/326, 327, 329, 333, 335; 382/276, 286, 291; 709/200, 203, 204–207; 725/105, 114–117; H04N 5/222, 5/232, 7/00, 7/14

(56) References Cited

U.S. PATENT DOCUMENTS

| 5,550,982 | * | 8/1996 | Long | 725/93 |
|---|---|---|---|---|
| 5,577,107 | * | 11/1996 | Inagaki | 379/93.17 |
| 5,617,312 | * | 4/1997 | Iura | 700/83 |
| 5,625,410 | * | 4/1997 | Washino | 348/154 |
| 6,067,624 | * | 5/2000 | Kuno | 713/202 |
| 6,088,737 | * | 7/2000 | Yano | 709/235 |
| 6,122,005 | * | 9/2000 | Sasaki | 348/211 |
| 6,133,941 | * | 10/2000 | Ono | 348/14.05 |
| 6,137,485 | * | 10/2000 | Kawai | 348/14.03 |

FOREIGN PATENT DOCUMENTS 0 734 157   9/1996   (EP) ............................. H04N/5/232

* cited by examiner

*Primary Examiner*—Wendy R. Garber
*Assistant Examiner*—Ngoc-Yen Vu
(74) *Attorney, Agent, or Firm*—Robin, Blecker & Daley (57) ABSTRACT

A camera control system capable of controlling a video camera of a camera server apparatus according to a control command from clients is arranged not to accept requests for a right to control the video camera from any of clients when the number of clients receiving a video image picked up by the video camera exceeds a predetermined number. If the number of clients is less than the predetermined number, the camera control system, upon receipt of a request for the control right from any of clients, accepts the request to permit the client to control the video camera.

34 Claims, 7 Drawing Sheets

CAMERA CONTROL SYSTEM WITH RESTRAIN BASED ON THE NUMBER OF CLIENTS HAVING ACCESS

BACKGROUND OF THE INVENTION

Field of the Invention

The present invention relates t o a camera control system arranged to capture a video signal from an image pickup apparatus and distribute the video signal to clients through a network, and also relates to matters concerned with the camera control system.

Description of Related Art

There are known systems in which a video image obtained from a video camera connected to a network such as the Internet is rendered viewable at a number of remote places (clients). In some of such systems, the clients are enabled not only to view the video image from the video camera but also to remotely control the video camera in such a way as to vary its panning and tilting angles and its zoom magnification. For example, a camera control system has been developed by the assignee of the present invention, in which a video camera which is controllable by computers is connected to a server connected to a WWW (world wide web) of the Internet, a video image picked up by the video camera is distributed in real time to clients so as to display the video image, and in addition, the panning, tilting, zooming, etc., of the video camera are enabled to be controlled by the clients. In such a camera control system, only one of the clients is allowed to acquire a control right to control the video camera, so that only the client having acquired the control right can perform a camera control, such as panning and tilting of the video camera, at a time. Further, in the camera control system, if a plurality of clients wish to control the video camera, the clients wishing the camera control may be given the control right to the video camera one after another at intervals of a predetermined time.

However, with one video camera arranged to be accessible by a plurality of clients through a network, the above-stated arrangement for enabling only one client having the camera control right to control the video camera for panning or tilting in a desired direction or for serially shifting the camera control right from one client to another tends to make the video image extremely disagreeable to most of clients other than the client who is controlling the video camera. Therefore, in cases where a great number of clients are viewing a video image obtained from the video camera, the arrangement for granting the camera control right to a specific client or clients does not always give a good result.

Further, when the camera control right is shifted from one client to another, a video image picked up by the video camera as desired by many other clients might be suddenly changed over to another video image directed in a very different direction. Such a change is extremely disagreeable to the other clients viewing the video image.

BRIEF SUMMARY OF THE INVENTION

The invention is directed to the solution of the above-stated problems of prior art. It is, therefore, an object of the invention to provide a camera control system which is arranged to be capable of preventing a video image obtained from a video camera from becoming disagreeable to clients in a case where a great number of clients are in access to the video camera.

It is another object of the invention to provide a camera control system which is arranged to be capable of adequately controlling a video camera according to the number of clients viewing a video image from the video camera.

It is a further object of the invention to provide a camera control system which is arranged to be capable of adequately grasping the status of control over a video camera even when the right to control the video camera is not shifted to any of clients.

It is a still further object of the invention to provide a camera control system which permits clients to continuously view a desired video image even when the camera control right shifts from one client to another.

To attain at least one of the above objects, in accordance with one aspect of the invention, there is provided a camera control system capable of controlling a video camera connected to a camera server in accordance with a control command from clients, which comprises the clients each including access means for requesting the camera server to allow access to the video camera, and control command output means for outputting a control command for controlling the video camera, and the camera server including video image output means for outputting a video signal from the video camera to the clients which are in access to the video camera, determining means for determining whether the number of the clients which are in access to the video camera is not less than a predetermined number, control means for controlling the video camera on the basis of the control command from the client, and restraining means for restraining the control means from controlling the video camera, in accordance with a result of determination provided by the determining means.

Further, in accordance with another aspect of the invention, there is provided a control method of controlling a camera server which controls a video camera connected thereto in accordance with a control command from clients, which comprises a video image output step of outputting a video signal from the video camera to the clients which are in access to the video camera, a determining step of determining whether the number of the clients which are in access to the video camera is not less than a predetermined number, a control step of controlling the video camera on the basis of the control command from the client, and a restraining step of restraining the video camera from being controlled by the control step, in accordance with a result of determination provided by the determining step.

Further, in accordance with a further aspect of the invention, there is provided a camera server which controls a video camera connected thereto in accordance with a control command from clients, which comprises video image output means for outputting a video signal from the video camera to the clients which are in access to the video camera, determining means for determining whether the number of the clients which are in access to the video camera is not less than a predetermined number, control means for controlling the video camera on the basis of the control command from the client, and restraining means for restraining the control means from controlling the video camera, in accordance with a result of determination provided by the determining means.

Further, in accordance with a still further aspect of the invention, there is provided a storage medium in which is stored a program for causing a camera server to execute processing for controlling a video camera connected thereto in accordance with a control command from clients, the program comprising a process of outputting a video signal from the video camera to the clients which are in access to the video camera, a process of determining whether the number of the clients which are in access to the video camera is not less than a predetermined number, a process of controlling the video camera on the basis of the control command from the client, and a process of restraining the video camera from being controlled on the basis of the control command from the client, in accordance with a result of determination provided by the determining process.

The above and further objects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

(First Embodiment)

In accordance with a first embodiment of the invention, a control method of controlling a video camera is changed according to the number of clients (client apparatuses) which are receiving a video image from the video camera and displaying the video image. More specifically, when only a few number of clients are receiving a video image from the video camera, the control right to control the video camera is serially given to the clients wishing to control the video camera, for example, one after another at intervals of a predetermined time. When there are a great number of clients, the control right to control the video camera is not given to any of the clients, and the video camera is automatically operated to send a video image. Further, when the camera control right is transferred from one client to another, a video image to be displayed in the client who has last had the control right is, if desired, displayed in the form of a still image which is a video image obtained immediately before the control right is transferred, without shifting to a video image obtained under the control of the client to which the control right is transferred.

Figure 1:
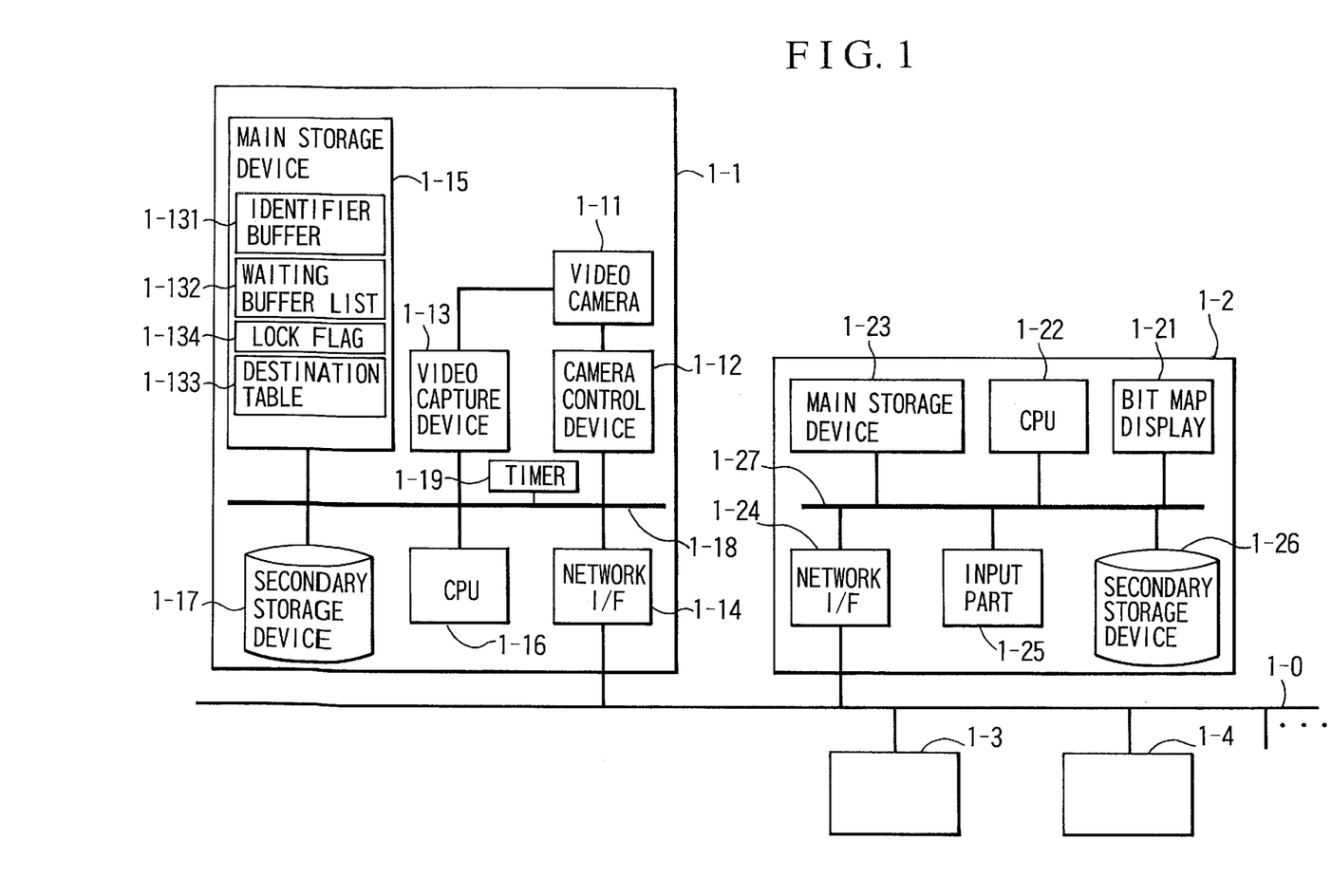
FIG. 1 is a block diagram showing the arrangement of an image pickup system according to a first embodiment of the invention.

FIG. 1 shows in a block diagram the arrangement of an image pickup system according to the first embodiment.

Referring to FIG. 1, the image pickup system includes a camera server apparatus 1-1 and client apparatuses (display operation terminals operable by users) 1-2, 1-3, 1-4, - - - , which are connected to a network 1-0. The camera server apparatus 1-1 is arranged to capture a video signal from a video camera 1-11 and to distribute the video signal via the network 1-0 to the client apparatuses which are in access to the camera server apparatus 1-1. The camera server apparatus 1-1 is further arranged to receive a camera control command via the network 1-0 from a client apparatus having the control right to control the video camera 1-11, and to control the video camera 1-11 according to the camera control command. In the case of the first embodiment, the client apparatuses have the same construction, and the number of client apparatuses is not limited. Each of the client apparatuses 1-2 to 1-n (n-1 apparatuses) is able to display a video image obtained from the camera server apparatus 1-1 by requesting the camera server apparatus 1-1 to send the video image. Further, each of the client apparatuses 1-2 to 1-n is able to control the video camera 1-11 when having acquired the camera control right by outputting a camera control request to the camera server apparatus 1-1. In this case, the video camera 1-11 of the camera server apparatus 1-1 can be controlled by the clients having the control right by turns one after another. However, the video camera 1-11 can be controlled exclusively by one of the clients at a time.

The details of the arrangement of the camera server apparatus 1-1 are next described below.

The camera server apparatus 1-1 includes the video camera 1-11, a camera control device 1-12 which constitutes a panhead for the video camera 1-11 to control its panning and tilting actions and is arranged to control also its zoom magnification, etc., a video capture device 1-13 which is arranged to capture a video image from the video camera 1-11, a network interface (I/F) 1-14 which is arranged to deliver the video image data captured by the video capture device 1-13 onto the network 1-0, a CPU 1-16 which is arranged to control each of the above-stated units, a main storage device 1-15 (the data storing arrangement of which will be described later), and a secondary storage device 1-17 which is arranged to store a control program and data of various kinds.

Further, the camera control device 1-12 is arranged to receive a camera control command through the network interface 1-14 and is able to control panning, tilting, zooming, etc., of the video camera 1-11 according to the camera control command. The video capture device 1-13 is arranged to obtain a video signal of the NTSC system from the video camera 1-11, to A/D-convert the video signal into a digital signal and to compress the digital signal before delivering it to the network interface 1-14. In this case, the video image can be compressed by one of known methods called "Motion JPEG", "MPEG", etc. Acceptable video image compressing methods are, however, not limited to these methods.

The camera server apparatus 1-1 further includes a timer 1-19. The timer 1-19 is arranged to count time in accordance with an instruction of the CPU 1-16. An event is arranged to take place for the CPU 1-16 when a time-out occurs in the timer 1-19. A system bus 1-18 is arranged to connect the units described above to each other.

The arrangement of each client apparatus is next described. The client apparatuses 1-2 to 1-n in the first embodiment are constructed and operate in the same manner. Therefore, the arrangement of only the client apparatus 1-2 is described below with reference to FIG. 1.

Figure 2:
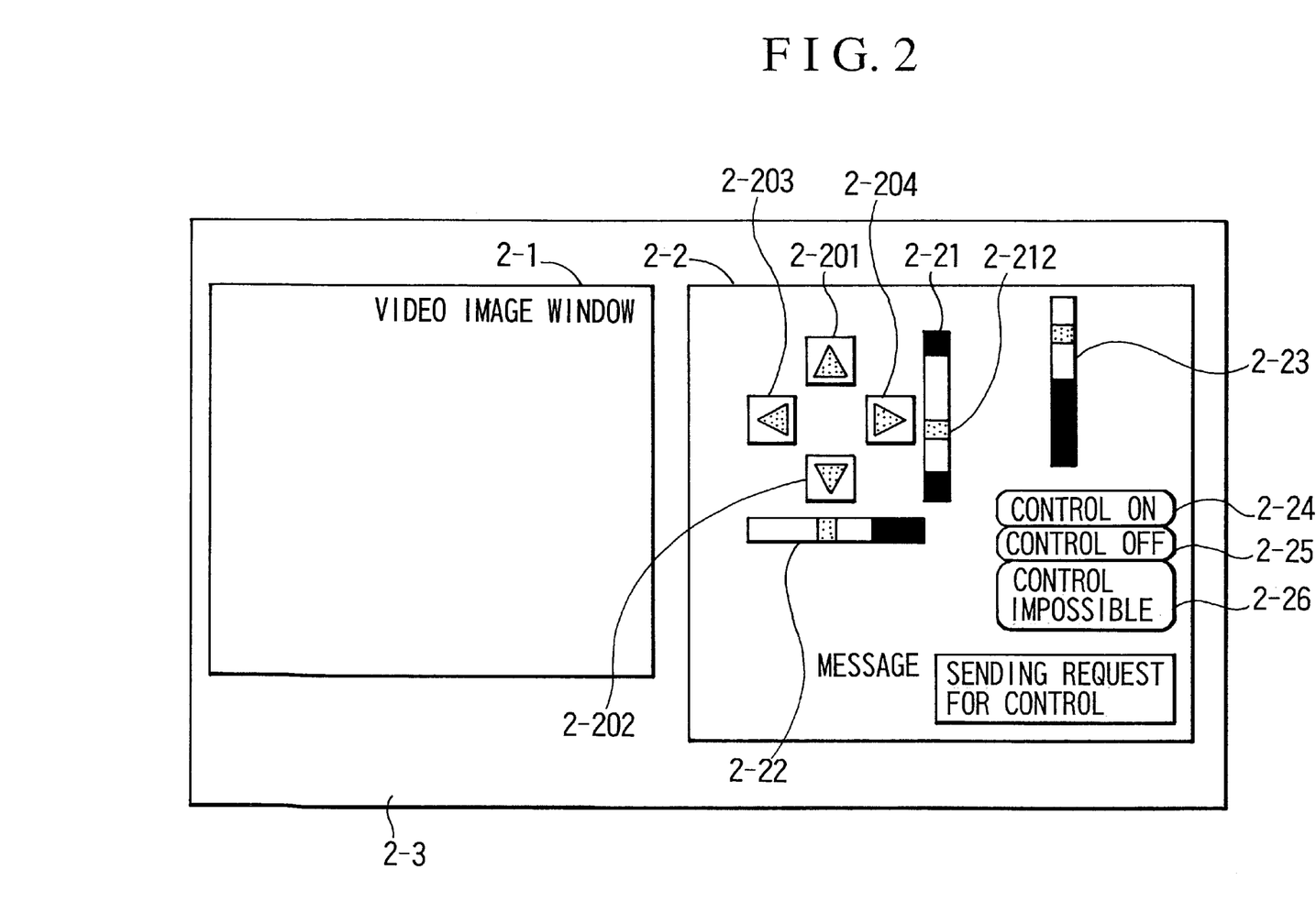
FIG. 2 shows by way of example a display made on an image plane at a client apparatus in the first embodiment.

Compressed video image data delivered from the camera server apparatus 1-1 is received through a network interface (I/F) 1-24. The video image data thus received is expanded under the control of a CPU 1-22 to be displayed on a screen 2-3 of a bit map display 1-21, as shown in FIG. 2. Further, as shown in FIG. 2, a user interface picture is arranged to be displayed on the bit map display 1-21. A main storage device 1-23 is arranged to store a control program, etc., to be executed by the CPU 1-22. An input part 1-25 is provided with a pointing device such as a mouse, a keyboard, etc. A secondary storage device 1-26 which is a hard disk or the like is arranged to store data and various programs to be executed by the CPU 1-22.

Referring to FIG. 2, a video image window 2-1 and a camera operating window 2-2 are displayed on the screen 2-3 of the bit map display 1-21 in the client apparatus 1-2. The video image picked up by the video camera 1-11 of the camera server apparatus 1-1 is displayed on the video image window 2-1. In the camera operating window 2-2, buttons 2-201, 2-202, 2-203 and 2-204 are provided for giving an instruction to move the video camera 1-11 upward, downward, to the left and to the right, respectively. Scroll bars 2-21, 2-22 and 2-23 are provided for varying the degrees of tilting and panning and the zoom magnification, respectively. With the camera control right obtained, when an instruction is given from the client apparatus by operating the mouse of the input part 1-25 (FIG. 1), by dragging it for example, a control command corresponding to the instruction is sent through the network interface 1-24 and the network 1-0 to the camera server apparatus 1-1. A control ON button 2-24 is provided for instructing to acquire the camera control right. A control OFF button 2-25 is provided for instructing to release the camera control right. An indicator 2-26 is arranged to indicate that it is impossible at present to control the video camera 1-11.

Incidentally, a panning or tilting action on the video camera 1-11 is controlled on the basis of a specific initial position and an angle of the photo-taking optical axis with respect to the initial position. In the case of the first embodiment, the specific initial position is set exactly at a middle point of a range within which the posture of the video camera 1-11 physically can be panned or tilted. Further, some window system that is arranged to be capable of forming a picture as shown in FIG. 2 is assumed to be in operation at the client apparatus 1-2.

Figure 3:
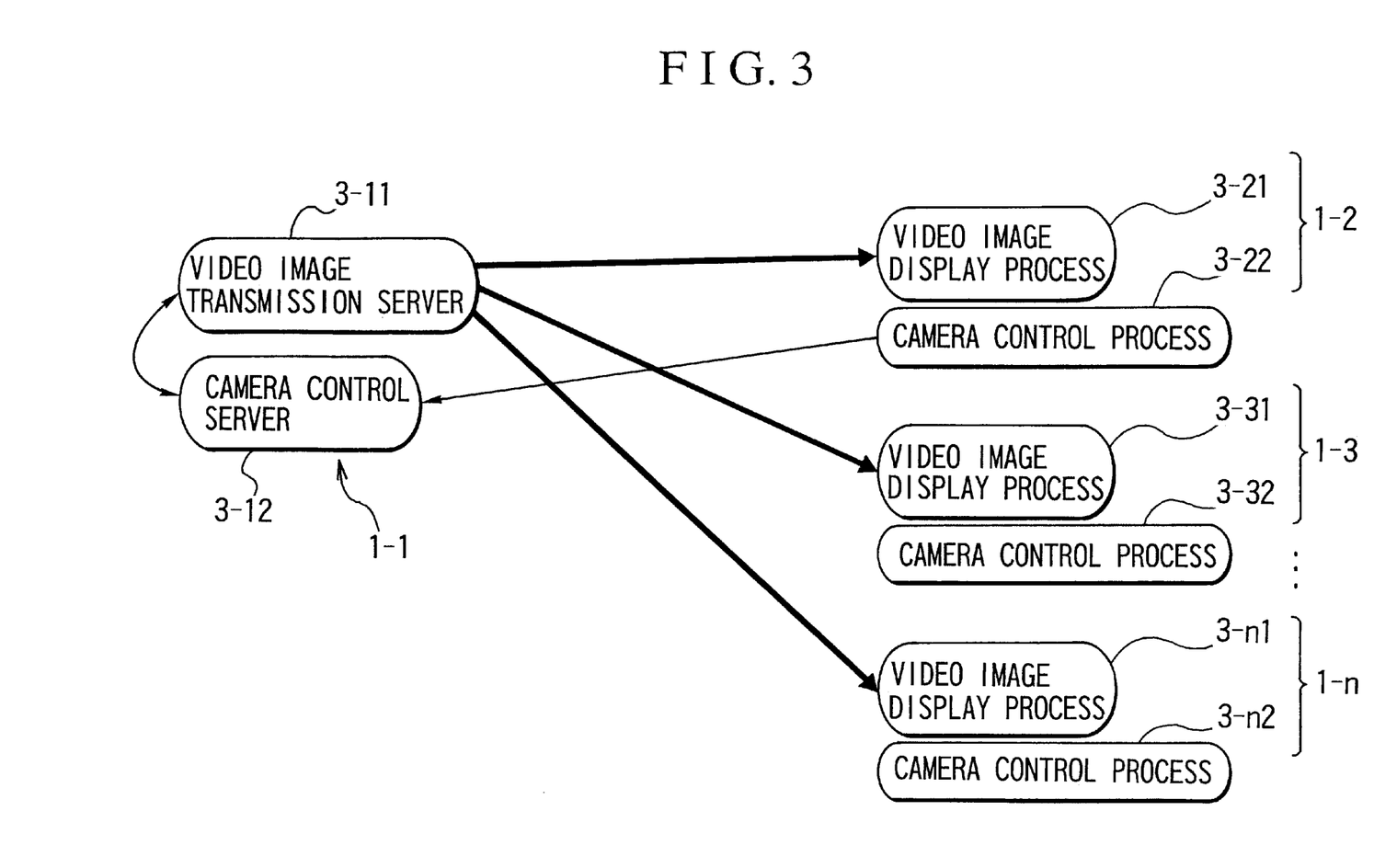
FIG. 3 schematically shows processes to be executed by a camera server apparatus and the client apparatus in the first embodiment.

FIG. 3 is a schematic illustration showing the software arrangement of the image pickup system in the first embodiment.

Referring to FIG. 3, a video image display process 3-31 and a camera control process 3-22 are operating at the client apparatus 1-2. At each of other client apparatuses 1-3 to 1-n, a video image display process 3-i1 and a camera control process 3-i2 are also operating. On the side of the camera server apparatus 11, a video image transmission server 3-11 and a camera control server 3-12 is operating.

The video image transmission server 3-11 which is operating on the camera server apparatus 1-1 controls the processes of capturing a video image from the video camera 1-11 and compressing and delivering the video image. The video image display process 3-21, on the side of the client apparatus 1-2, controls the process of receiving the compressed video image delivered from the video image transmission server 3-11 through the network 1-0 and also the processes of expanding and displaying the video image on the video image display window 2-1.

The camera control server 3-12 is arranged to receive a camera control command issued from the camera control process 3-22 and to control the video camera 1-11 by controlling the camera control device 1-12 according to the camera control command. The camera control process 3-22 of the client apparatus 1-2 is arranged to display the camera control window 2-2 on the screen 2-3 of the bit map display 1-21 to provide user interfaces of various kinds for operating the video camera, for example, as shown in FIG. 2.

For controlling operations on the video camera 1-11, the first embodiment is arranged to vary a method of controlling the video camera 1-11 according to the number of client apparatuses which are currently in access to the video camera 1-11, i.e., which are currently receiving a video image from the video camera 1-11. More specifically, when the number of client apparatuses which are in access to the video camera 1-11 is small, one of the clients is exclusively permitted to control the video camera 1-11 at a time, and the camera control right is shifted from one client to another client requesting the control right in turn at intervals of a predetermined time. In this instance, the camera control server 3-12 of the camera server apparatus 1-1 performs exclusive control in such a way as to permit only the client apparatus which currently has the control right to control and operate the video camera 1-11. In a case where the number of clients receiving a video image from the video camera 1-11 becomes greater than a predetermined number, the camera control server 3-12 does not give the right to control the video camera 1-11 to any of the client apparatuses, and then the video camera 1-11 is automatically controlled for panning, tilting or zooming and a video image thus picked up is delivered onto the network 1-0. In that instance, each of the client apparatuses is caused to light up the indicator 2-26 (shown in FIG. 2) to indicate that it is impossible to control the video camera 1-11.

Figure 4:
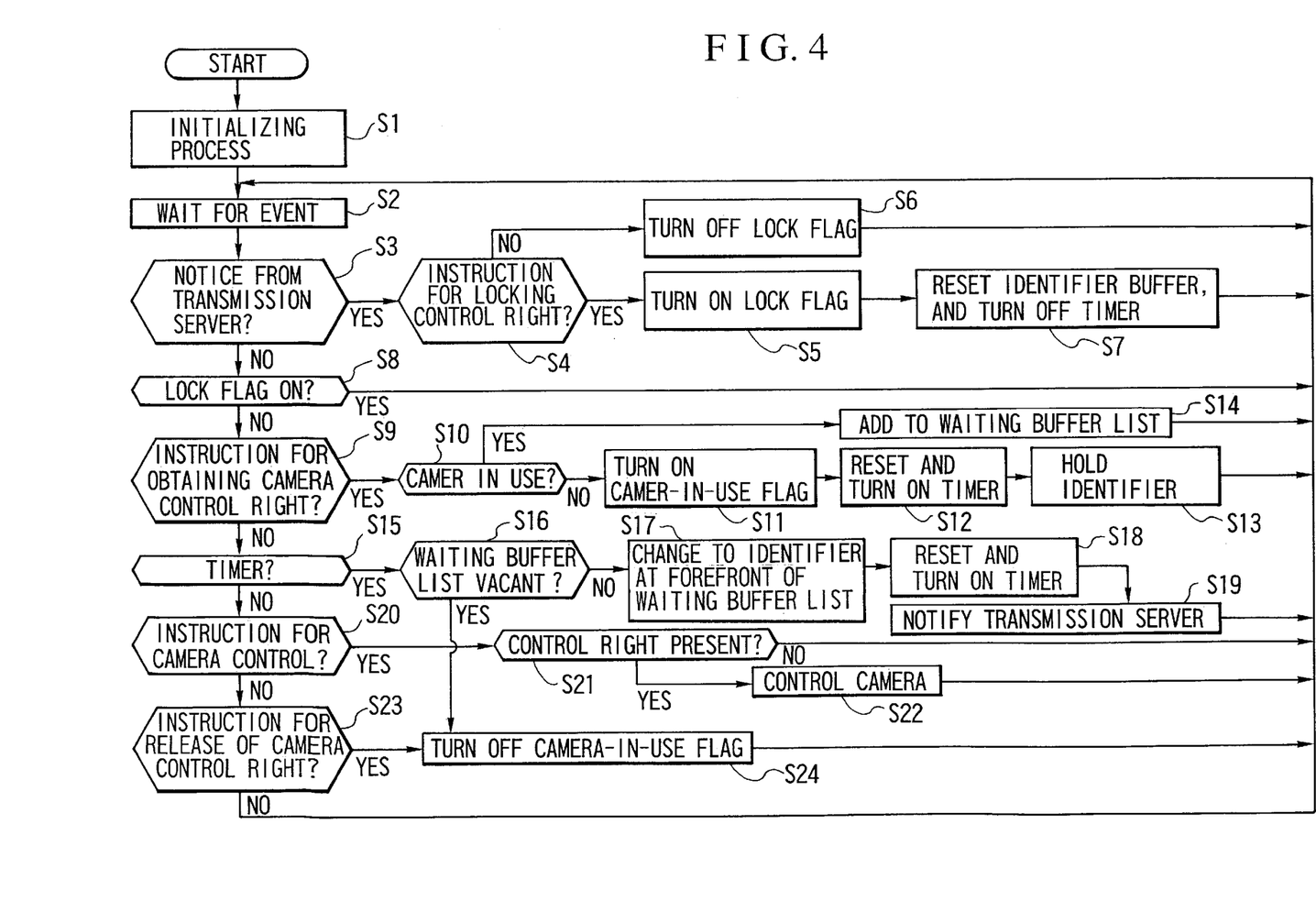
FIG. 4 is a flow chart showing an operation of a camera control server in the first embodiment.

FIG. 4 is a flow chart showing an operation of the camera control server 3-12 of the camera server apparatus 1-1 in the first embodiment. A control program to be executed by the camera control server 3-12 is stored in the secondary storage device 1-17 and is arranged to be loaded on the main storage device 1-15 at the time of execution. The camera control server 3-12 operates as described below with reference to FIG. 4.

At a step S1, an initializing process is executed to set the initial panning and tilting angles and the zoom magnification. At a step S2, the flow of operation waits for any event caused either by a request made through the network interface 1-14 or by some other program which are in process of execution. When an event occurs, the flow proceeds to a step S3. At the step S3, a check is made to find if the event has been delivered from the video image transmission server 3-11. If so, the flow proceeds to a step S4. At the step S4, a check is made to find if the event is caused by the determination that the number of client apparatuses which are receiving a camera video image from the video image transmission server 3-11 has become greater or less than a predetermined value. If the number of client apparatuses is found to exceed the predetermined value, the event represents an instruction for locking the control right to control the video camera 1-11, and the flow then proceeds to a step S5. At the step S5, a lock flag 1-134 in the main storage device 1-15 is turned on to make the camera control by any client apparatus impossible. At the next step S7, the content of an identifier buffer 1-131 in the main storage device 1-15 is reset, and the time count by the timer 1-19 is turned off. If the event is found at the step S4 to be not the instruction for locking the camera control right, the flow proceeds to a step S6. At the step S6, the lock flag 1-134 is turned off to make the camera control by one of the client apparatuses possible.

When the user of the client apparatus wishes to issue a request for the camera control right, the user points to the control ON button 2-24 displayed on the screen 2-3 through the mouse or the like, so that the request for the camera control right is sent to the camera server apparatus 1-1 via the network 1-0. As a result, an event occurs at the step S2 in FIG. 4. The flow of operation then proceeds to a step S8 through the step S3. At the step S8, a check is made to find if the lock flag 1-134 is in its on-state. If so, the flow returns to the step S2 without any action.

If the lock flag 1-134 is found not to be in its on-state, the flow proceeds to a step S9. At the step S9, a check is made to find if the event is an instruction for acquiring the camera control right. If so, the flow proceeds to a step S10. At the step S10, a check is made to find if the video camera 1-11 which is to be controlled is in use. If not, the flow proceeds to a step S1. At the step S11, a camera-in-use flag which indicates that the video camera 1-11 is in use is turned on. At the next step S12, the timer 1-19 is reset. At a step S13, an identifier of the client apparatus from which the request for the camera control right is received is stored in the identifier buffer 1-131 (the identifier of the client apparatus is included in its request). Meanwhile, if the video camera 1-11 to be controlled is found at the step S10 to be in use (under control), the flow proceeds to a step S14. At the step S14, the identifier of the client apparatus is added and registered in a waiting buffer list 1-132.

With the steps S11, S12 and S13 executed in the manner as described above, the client apparatus having acquired the control right for the video camera 1-11 is allowed to perform various operations by using the camera control window 2-2. However, if the client apparatus fails to acquire the control right, the buttons other than the control ON button 2-24 are rendered not operable.

Further, in the client apparatus having acquired the camera control right, when the camera control OFF button 2-25 is pointed to, an instruction for releasing the camera control right is issued and sent to the network 1-0. Then, at a step S23 in the flow chart of FIG. 4, the control right for the video camera 1-11 is determined to be released, and the flow proceeds to a step S24. At the step S24, the camera-in-use flag is reset. In the case of the first embodiment, to make all the client apparatuses connected to the network distinguishable, the network addresses of the client apparatuses are used, for example, as their identifiers. While the camera-in-use flag is in a set state at the camera server apparatus 1-1, every client apparatus that does not have the camera control right is not allowed to control the video camera 1-11 of the camera server apparatus 1-1.

On the side of the camera server apparatus 1-1, when a camera control command is received at a step S20, the flow of operation proceeds to a step S21. At the step S21, a check is made to find if the identifier of the client apparatus from which the camera control command is received coincides with an identifier registered in the identifier buffer 1-131. If so, the flow proceeds to a step S22 to accept the camera control command from that client apparatus. If not, the flow returns to the step S2 without accepting the camera control command from that client apparatus.

As described above, the camera control right to be executed by the client apparatus is managed on the basis of a time count by the timer 1-19. One client apparatus is allowed to have the right to control the video camera 1-11 only for a prescribed period of time. After the lapse of the prescribed period of time, an event is caused to occur by the timer 1-19, and the flow proceeds from a step S15 to a step S16 in FIG. 4. At the step S16, the client apparatus currently having the camera control right is forcibly deprived of the camera control right. Then, a check is made to find if there is any client apparatus that is registered in the waiting buffer list 1-132 and is currently waiting for its turn in acquiring the camera control right. If not, the flow proceeds to a step S24 to turn off the camera-in-use flag. If so, the flow proceeds to a step S17.

At the step S17, a client apparatus corresponding to an identifier held at the forefront of the waiting buffer list 1-132 is decided to be the next client apparatus to acquire the camera control right. At the next step S18, to monitor the lapse of time allotted to the camera control by the client apparatus, the timer 1-19 is initialized and allowed to start its time count. Then, at a step S19, the video image transmission server 3-11 is notified of the identifier of the client apparatus which is deprived of the camera control right. Upon receipt of the notification, the video image transmission server 3-11 suspends sending a video image to the client apparatus which is deprived of the camera control right, for the purpose of causing a video image last delivered to that client apparatus to temporarily become a still image. On the side of the client apparatus to which the delivery of the video image is suspended, an image last received immediately before the suspension is stored as a still image, and the still image is displayed on the bit map display 1-21.

Figure 5:
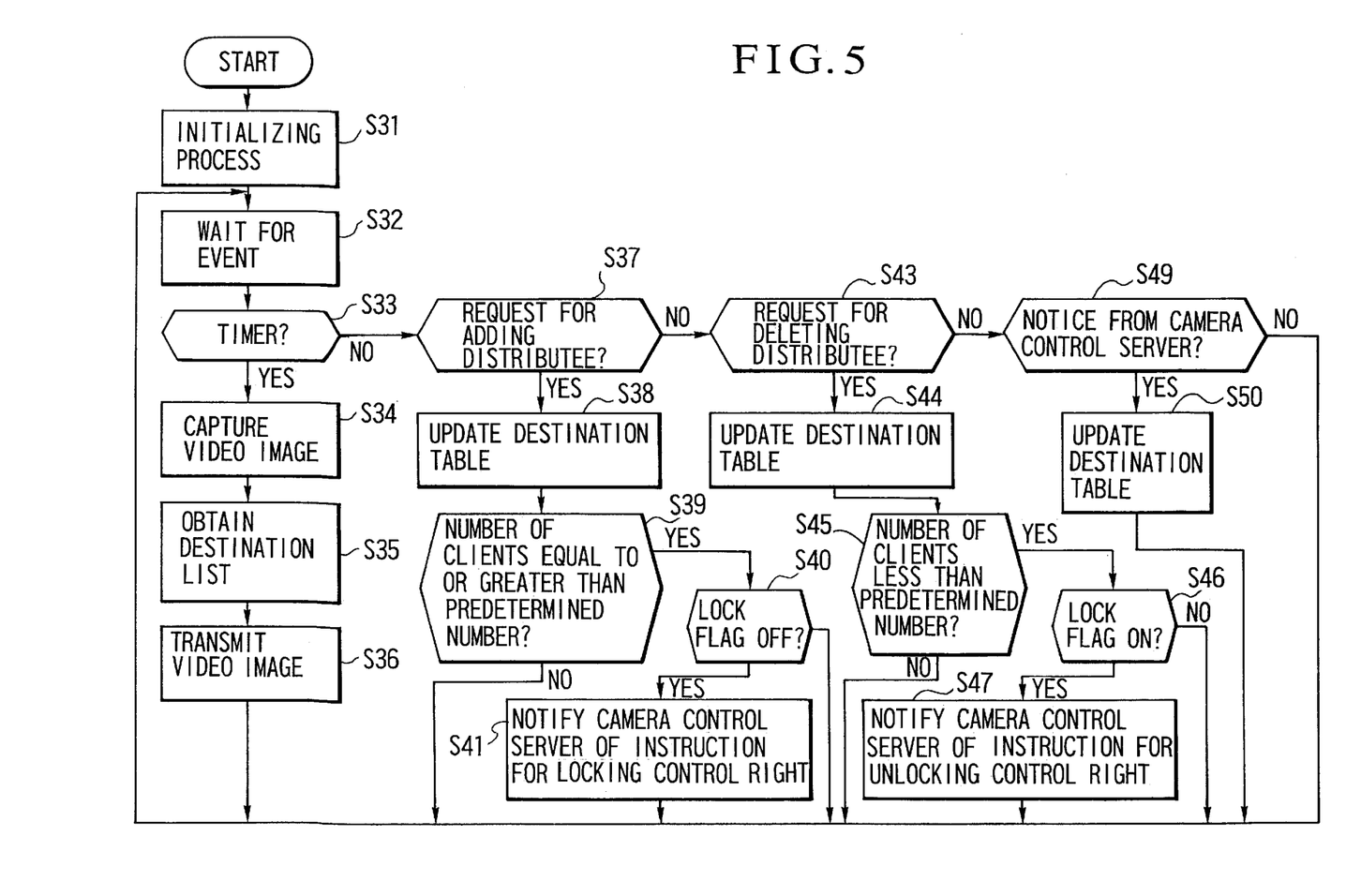
FIG. 5 is a flow chart showing an operation of a video image transmission server in the first embodiment.

FIG. 5 is a flow chart showing an operation of the video image transmission server 3-11 of the camera server apparatus 1-1 in the first embodiment operates. As in the case of the flow chart of FIG. 4, a control program to be executed by the video image transmission server 3-11 is also stored in the secondary storage device 1-17 and is arranged to be loaded on the main storage device 1-15 for execution. The video image transmission server 3-11 operates as described below with reference to FIG. 5.

At steps S32 to S36, a video image is captured from the video camera 1-11 and is delivered to the network 1-0 at intervals of a predetermined period of time counted by the timer 1-19. The video signal obtained in this instance is sent to the video image display process of each of the client apparatuses registered in a destination table 1-133. Here, if the video image display process of a new client apparatus is activated and a request for adding a new destination is received from the video image display process of the new client apparatus, steps S37 and S38 are executed to register the client apparatus at which the video image display process is acting by adding an identifier of that client apparatus to the destination table 1-133. After the steps S37 and S38, the flow proceeds to a step S39. At the step S39, a check is made for the number of clients, i.e., the number of identifiers registered in the destination table 1-133. If the number of clients, i.e., distributees, is found to have exceeded a predetermined value, the flow proceeds to a step S40. At the step S40, a check is made for the state of the lock flag 1-134. If the lock flag 1-134 is found to be in an on-state which indicates that the camera control right is locked, the flow returns to the step S32 without any action. If the lock flag 1-134 is found at the step S40 to be in an off-state, the flow proceeds to a step S41. At the step S41, an instruction for locking the camera control right is sent to the camera control server 3-12.

In a case where a notification of stopping receiving the delivery of the video image is received from a client apparatus currently receiving the video image, the video image display process of the client apparatus requests the video image transmission server 3-11 to delete the client apparatus as a distributee from the list of destinations. The flow of operation of the video image transmission server 3-11 then proceeds from a step S43 to a step S44. At the step S44, the identifier of the client apparatus is deleted from the destination table 1-133, contrary to the above-stated step of adding a destination. Then, the flow proceeds to a step S45 to make a check for the number of clients. If the number of clients is found to have become less than the predetermined value, the flow proceeds to a step S46. At the step S46, the lock flag 1-134 is checked for its state. If the lock flag 1-134 is found to be in its on-state thus indicating that no client has the camera control right, the flow proceeds to a step S47. At the step S47, an instruction for unlocking the camera control right is sent to the camera control server 3-12.

In a case where the camera control server 3-12 notifies the video image transmission server 3-11, at a step S49, that the right to control the video camera 1-11 has shifted from one client apparatus to another, the flow of operation proceeds from the step S49 to a step S50. At the step S50, to make into a still image the video image delivered to the client apparatus where the camera control right has been last held, a video image is stopped from being delivered to that client apparatus from the video image transmission server 3-11. Then, an identifier of that client apparatus is deleted from the destination table 1-133.

As described above, the first embodiment is arranged to make control over the video camera impossible by any of the client apparatuses when the number of client apparatus in access to the video camera comes to exceed a predetermined number. This arrangement enables the embodiment to effectively prevent a video image from becoming disagreeable under the control by many clients.

Further, each client apparatus is allowed to receive and display a video image from the video camera irrespective as to whether the client has the right to control the video camera. In that instance, the clients are preferably informed of the direction in which the video camera is directed and the zoom magnification at which a video image is being picked up. Therefore, a control arrangement is made to enable clients to have such information, for example, as described below.

At the camera control server 3-12 of the camera server apparatus 1-1, after the video camera 1-11 is controlled at the step S22 in FIG. 4, data is prepared, according to actions intended by the control, to indicate the current status of the control, such as a panning angle, a tilting angle or the zoom magnification. The data for the control status thus prepared is supplied to the video image transmission server 3-11 with a command for sending the data to the clients along with the video signal. As a result, in the flow chart of FIG. 5, the control status data is sent to the clients along with the video signal under the control of the video image transmission server 3-11.

Figure 6:
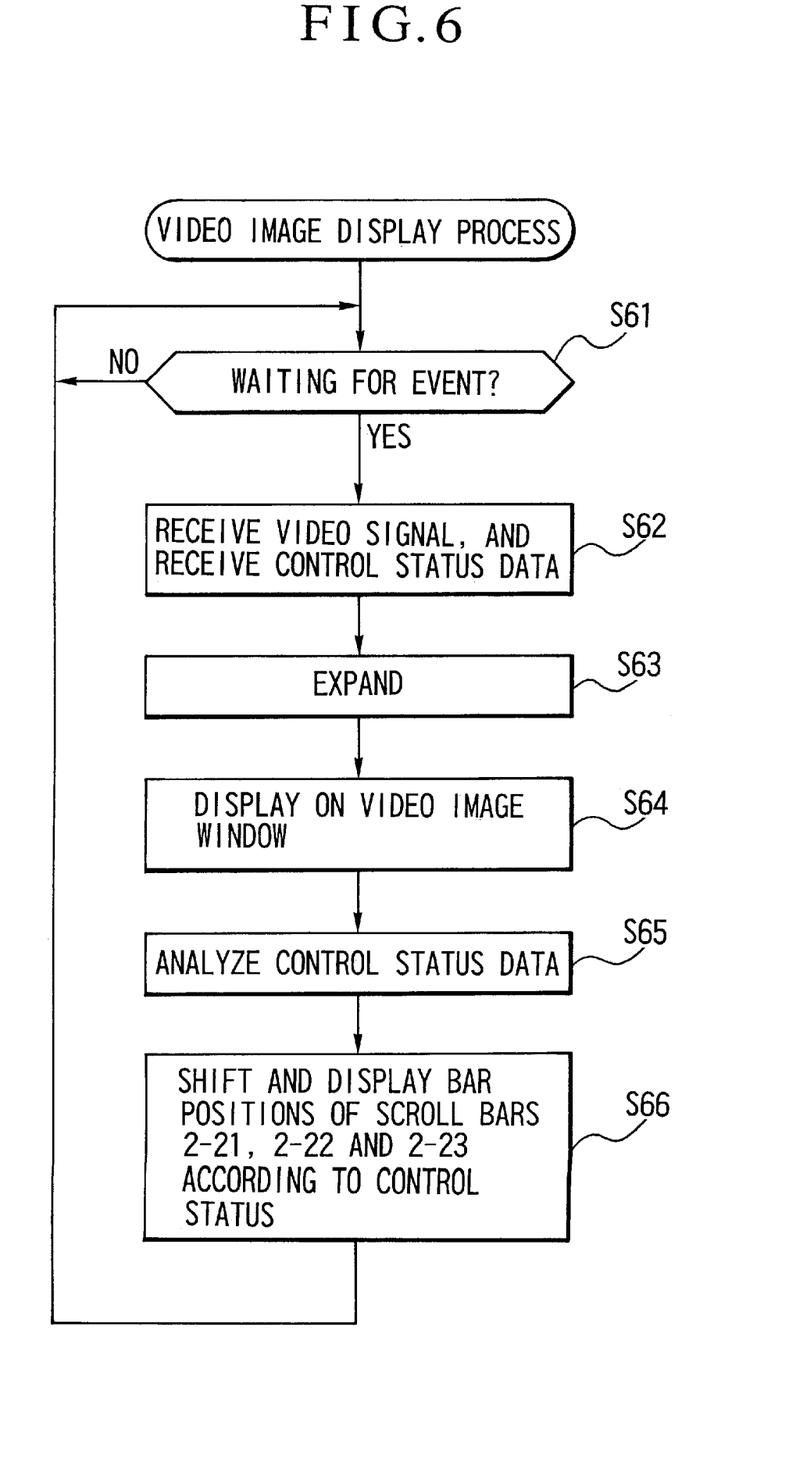
FIG. 6 is a flow chart showing processes to be performed by the client apparatus in the first embodiment in displaying a video image.

FIG. 6 is a flow chart showing the processes to be executed by the video image display process 3-21 at the client apparatus. A control program for these processes is stored in the secondary storage device 1-26 and is arranged to be loaded on the main storage device 1-23 and to be executed under the control of the CPU 1-22.

Referring to FIG. 6, at a step S61, the flow of operation waits for occurrence of an event for receiving a video signal. When the event occurs, the flow proceeds to a step S62. At the step S62, the video signal and the control status data are received via the network 1-0 from the camera server apparatus 1-1. At a step S63, the video signal is expanded. At a step S64, a video image represented by the video signal is displayed on the bit map display 1-21. At a step S65, the control status data is analyzed. At a step S66, the bar positions of the scroll bars 2-21, 2-22 and 2-23, for example, shown in FIG. 2 are changed and displayed according to the control status data thus analyzed.

With the processes executed by the video image display process of each client apparatus in the manner described above, the user who is looking at a video image which is currently picked up by the video camera 1-11 and is displayed at the client apparatus is allowed to know the current status of control over the video camera 1-11, such as panning and tilting angles and a zoom magnification.

(Second Embodiment)

In the first embodiment described above, a request for the camera control right from any of the client apparatuses is not accepted until the camera control right is unlocked when the right is locked by the camera server apparatus 1-1. In a second embodiment of the invention, on the other hand, the video camera is automatically controlled in a predetermined manner while the camera control right is locked. With the exception of this point, the arrangement of the second embodiment is the same as that of the first embodiment.

In the case of the second embodiment, camera control commands to be executed while the camera control right is in a locked state are written beforehand into the secondary storage device 1-17 of the camera server apparatus 1-1. While the lock flag 1-134 is in its set state, the camera server apparatus 1-1 reads the camera control commands out from the secondary storage device 1-17 as necessary to execute the camera control commands. It is also possible to periodically read out the camera control commands to repeatedly execute the camera control commands every time a predetermined period of time is counted up by the timer 1-19. That arrangement enables many clients to have access to a video image picked up by the video camera, under the automatic control, even while the camera control right is in the locked state. Many clients then can see not only a video image picked up at a fixed angle of panning or tilting or at a fixed zoom magnification but also a video image picked up at various panning and tilting angles and in a zoom-in or zoom-out state. Further, in the same manner as described with reference to FIG. 6 in the foregoing, the second embodiment may be also arranged to have the control status data sent out to the network 1-0 from the camera server apparatus 1-1 to vary the displayed states of scroll bars according to the data at each client apparatus, so that the users of the client apparatuses are enabled to know the status of control.

Figure 7:
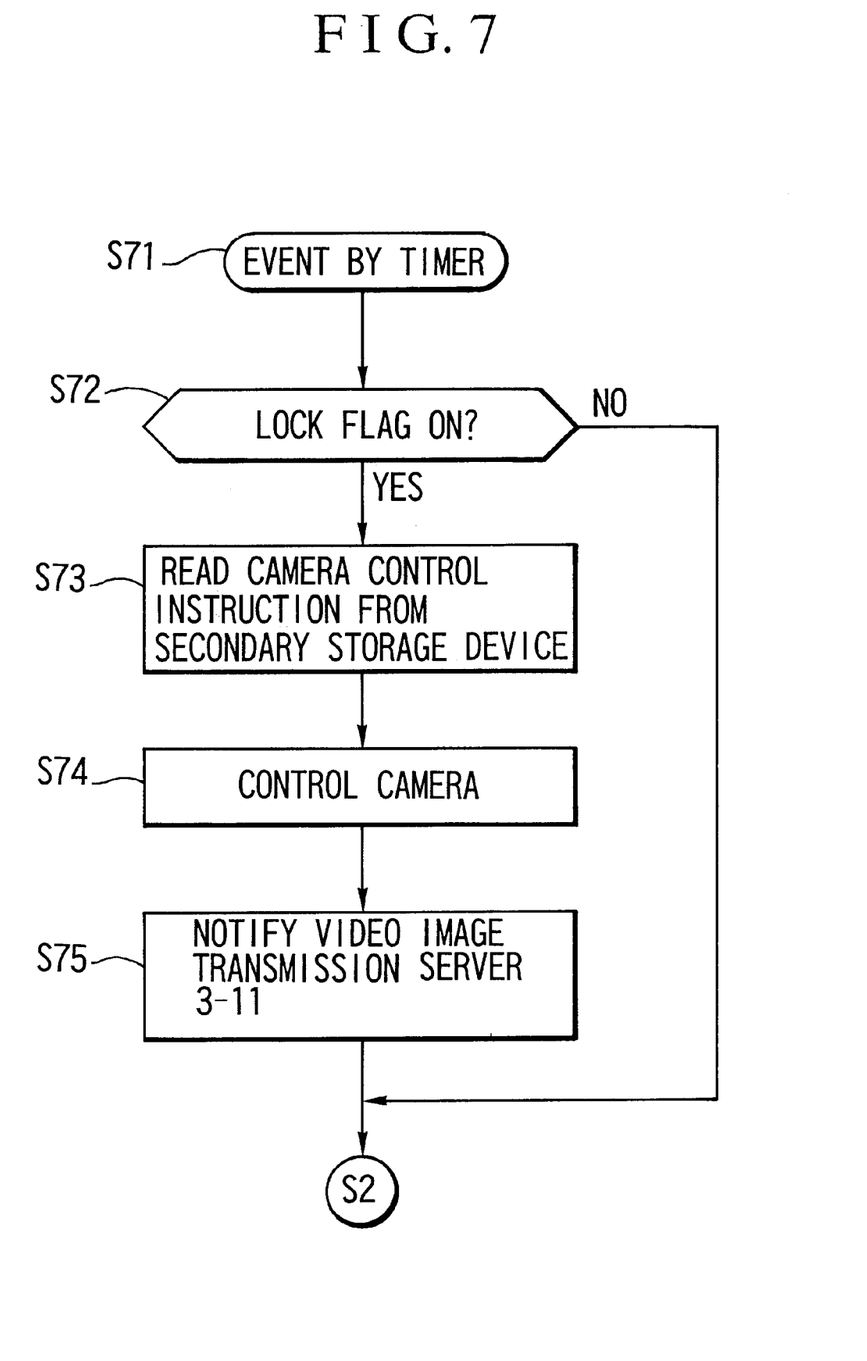
FIG. 7 is a flow chart showing an operation of a camera control server in an image pickup system according to a second embodiment of the invention.

FIG. 7 is a flow chart showing processes to be executed, in this case, by the camera control server 3-12. The flow chart of FIG. 7 is shown on the assumption that an event is brought about by the timer 1-19 and the video camera is controlled on the basis of the event.

Referring to FIG. 7, when an event is caused to occur by the timer 1-19 at a step S71, the flow of operation proceeds to a step S72. At the step S72, a check is made for the state of the lock flag 1-134. If the lock flag 1-134 is found to be in its on-state, the flow proceeds to a step S73. At the step S73, a camera control command (or camera control commands) stored in the secondary storage device 1-17 is read out. At a step S74, the video camera 1-11 is controlled according to the camera control command read out. Incidentally, a pointer is used in reading the camera control command. The pointer is updated every time a camera control command is read out with an event brought about by the timer 1-19. Camera control commands are thus arranged to be serially read out one after another by updating the pointer. The flow then proceeds to a step S75. At the step S75, control status data is prepared on the basis of commands used for the camera control. The control status data thus prepared is sent to the video image transmission server 3-11. Further, the above-stated timer may be either a hardware timer or a software timer.

(Third Embodiment)

The first embodiment described in the foregoing is arranged to inhibit the camera control by any of the client apparatuses until the camera control right is unlocked when the right is locked by the camera control server 3-12. A third embodiment of the invention is arranged, on the other hand, to give the camera control right to one or a plurality of specific client apparatuses to permit them to control the video camera 1-11 even while the camera control right is in the locked state. With the exception of this point, the arrangement of the third embodiment is identical with the first embodiment.

In the case of the third embodiment, a list of identifiers of the specific camera-controlling clients must be prestored in the secondary storage device 1-17. The camera server apparatus 1-1 is arranged to check this list, even when the lock flag 1-134 is in its on-state (as indicated at the step S8 in FIG. 4). If a request for granting or releasing the camera control right or for the camera control is received from a client apparatus the identifier of which is included in this list, the camera server apparatus 1-1 acts to accept the request even while the lock flag 1-134 is in its on-state. This arrangement enables some of specific clients among many other clients to control the video camera.

The arrangement of each of the embodiments described above may be applied, for example, either to a system composed of a plurality of apparatuses such as a host computer, an interface apparatus, a reader, a printer, etc., or to a system composed of one apparatus such as a copying machine, a facsimile apparatus, etc.

The object of each of the embodiments described above can be attained by providing a system or an apparatus with a storage medium in which program codes of software for realizing the functions of each embodiment is stored, and by arranging the computer (or a CPU or an MPU) of the system or the apparatus to read and execute the program codes stored in the storage medium.

In this instance, the program codes read out from the storage medium are arranged to realize the functions of each of the embodiments described above. Then, the storage medium is included also in the invention.

The storage medium which supplies the program codes may be selected, for example, from among storage media such as a floppy disk, a hard disk, an optical disk, a magneto-optical disk, a CD-ROM, a CD-R, a magnetic tape, a nonvolatile memory card, and a ROM.

The invention applies also to such cases where not only the functions of the embodiments described above are realized by executing the program codes read out by a computer but also processes required for the functions are executed, in accordance with the instructions of the program codes, either in part or in their entirety by an operating system (OS) operating on the computer.

The invention further applies also to a case where the program codes read out from a storage medium are written into a memory provided either on a function expanding board inserted in a computer or included in a function expanding unit connected to a computer, and, after that, processes required for the functions are executed, in accordance with the instructions of the program codes, either in part or in their entirety by a CPU or the like provided on the function expanding board or the function expanding unit.

Each of the embodiments described above is arranged, as described in the foregoing, to be capable of changing the mode of allowing the camera control by each client according to the number of client apparatuses which are in access to the video camera. In other words, the camera control right is given to the clients one by one, by turns, if the number of clients is small and is not given to any of the clients if there are a large number of clients. In the latter case, the camera control system may be arranged to automatically perform the camera control and to distribute a video image picked up under the automatic control to the clients.

Therefore, the above-stated arrangement enables each embodiment to impartially distribute a video image, avoiding the camera control by each individual client, if there are many clients in access to the video image picked up by the video camera. In a case where the number of clients is not large, requests from clients for the right to control the video camera are accepted to permit the clients desiring to have the right to execute the control right by turns. Further, even in a case where there are many clients, the embodiment may be arranged to more flexibly cope with the desire of clients by arranging the video camera to be controllable by specific clients.

Further, the arrangement for causing a video image obtained immediately before a shift of the camera control right from one client to another to be displayed in the form of a still image at the client who is deprived of the camera control right effectively saves that client from being forced to see an unwanted video image resulting from a change in the direction of the video camera.

As described above, it is an advantage of the arrangement of each embodiment that, in a case where many clients have access to the image pickup apparatus, the right to control the image pickup apparatus is not given to any of the client, so that a video image from the image pickup apparatus can be prevented from becoming disagreeable.

It is another advantage of the arrangement of each embodiment that the image pickup apparatus can be controlled according to the number of clients requesting for the camera control right.

It is a further advantage of each embodiment that the status of control over the image pickup apparatus can be clearly known even in a case where the right to control the image pickup apparatus is not shifted to any of the clients.

What is claimed is:

1. A camera control system capable of controlling a video camera connected to a camera server in accordance with a control command from clients, said camera control system comprising:

said clients each including:
  access means for requesting said camera server to allow access to said video camera; and
  control command output means for outputting a control command for controlling said video camera; and said camera server including:
  video image output means for outputting a video signal from said video camera to the clients which are in access to said video camera;
  determining means for determining whether a number of the clients which are in access to said video camera is not less than a predetermined number;
  control means for controlling said video camera on the basis of the control command from the client; and
  restraining means for restraining said control means from controlling said video camera, in accordance with a result of determination provided by said determining means.

2. A camera control system according to claim 1, wherein said restraining means inhibits said video camera from being controlled on the basis of the control command from the client, if the number of the clients which are in access to said video camera is not less than the predetermined number.

3. A camera control system according to claim 1, wherein said control command output means outputs the control command for said video camera to said camera server through a network.

4. A camera control system according to claim 1, wherein said camera server further includes:

storage means for storing control information for said video camera; and automatic control means for controlling said video camera on the basis of the control information for said video camera stored by said storage means, if said video camera is restrained by said restraining means from being controlled on the basis of the control command from the client.

5. A camera control system according to claim 1, wherein said camera server further includes permission means for permitting said control means to control said video camera by accepting a control command from a specific client even when said control means is restrained by said restraining means.

6. A camera control system according to claim 1, wherein said clients each further include control right requesting means for requesting said camera server to grant a right to control said video camera, and wherein said camera server further includes shifting means for shifting the right to control said video camera in sequence to the clients requesting the right to control said video camera.

7. A camera control system according to claim 6, wherein said clients each further include display means for, when the right to control said video camera is shifted to another client by said shifting means, displaying, as a still image, a video image obtained immediately before shifting of the right to control said video camera.

8. A camera control system according to claim 1, wherein said camera server further includes control information output means for outputting information on a current status of control over said video camera to the clients which are in access to said video camera.

9. A camera control system according to claim 8, wherein the information on the current status of control over said video camera to be outputted by said control information output means includes at least one of information of panning and tilting angles and information of a zoom magnification of said video camera.

10. A camera control system according to claim 1, wherein the control command to be outputted by said control command output means includes at least one of a control command for panning and tilting and a control command for zooming of said video camera.

11. A control method of controlling a camera server which controls a video camera connected thereto in accordance with a control command from clients, said control method comprising:

a video image output step of outputting a video signal from said video camera to the clients which are in access to said video camera;

a determining step of determining whether a number of the clients which are in access to said video camera is not less than a predetermined number;

a control step of controlling said video camera on the basis of the control command from the client; and a restraining step of restraining said video camera from being controlled by said control step, in accordance with a result of determination provided by said determining step.

12. A control method according to claim 11, wherein said restraining step is a step of inhibiting said video camera from being controlled on the basis of the control command from the client, if the number of the clients which are in access to said video camera is not less than the predetermined number.

13. A control method according to claim 11, further comprising a control command output step of outputting the control command for said video camera to said camera server through a network.

14. A control method according to claim 13, wherein the control command to be outputted by said control command output step includes at least one of a control command for panning and tilting and a control command for zooming of said video camera.

15. A control method according to claim 11, further comprising:

a storing step of storing control information for said video camera; and an automatic control step of controlling said video camera on the basis of the control information for said video camera stored by said storing step, if said video camera is restrained by said restraining step from being controlled on the basis of the control command from the client.

16. A control method according to claim 11, further comprising a permission step of permitting said video camera to be controlled by said control step by accepting a control command from a specific client even when said control step is restrained by said restraining step.

17. A control method according to claim 11, further comprising a control right requesting step of requesting said camera server to grant a right to control said video camera, and a shifting step of shifting the right to control said video camera in sequence to the clients requesting the right to control said video camera.

18. A control method according to claim 17, further comprising a display step of, when the right to control said video camera is shifted to another client by said shifting step, displaying, as a still image, a video image obtained immediately before shifting of the right to control said video camera.

19. A control method according to claim 11, wherein said camera server further includes a control information output step of outputting information on a current status of control over said video camera to the clients which are in access to said video camera.

20. A control method according to claim 19, wherein the information on the current status of control over said video camera to be outputted by said control information output step includes at least one of information of panning and tilting angles and information of a zoom magnification of said video camera.

21. A camera server which controls a video camera connected thereto in accordance with a control command from clients, said camera server comprising:

video image output means for outputting a video signal from said video camera to the clients which are in access to said video camera;

determining means for determining whether a number of the clients which are in access to said video camera is not less than a predetermined number;

control means for controlling said video camera on the basis of the control command from the client; and restraining means for restraining said control means from controlling said video camera, in accordance with a result of determination provided by said determining means.

22. A camera server according to claim 21, wherein said restraining means inhibits said video camera from being controlled on the basis of the control command from the client, if the number of the clients which are in access to said video camera is not less than the predetermined number.

23. A camera server according to claim 21, further comprising:

storage means for storing control information for said video camera; and automatic control means for controlling said video camera by reading the control information for said video camera stored by said storage means, if said video camera is restrained by said restraining means from being controlled on the basis of the control command from the client.

24. A camera server according to claim 21, further comprising permission means for permitting said control means to control said video camera by accepting a control command from a specific client even when said control means is restrained by said restraining means.

25. A camera server according to claim 21, further comprising shifting means for shifting a right to control said video camera in sequence to the clients requesting the right to control said video camera.

26. A camera server according to claim 21, further comprising control information output means for outputting information on a current status of control over said video camera to the clients which are in access to said video camera.

27. A camera server according to claim 26, wherein the information on the current status of control over said video camera to be outputted by said control information output means includes at least one of information of panning and tilting angles and information of a zoom magnification of said video camera.

28. A storage medium in which is stored a program for causing a camera server to execute processing for controlling a video camera connected thereto in accordance with a control command from clients, said program comprising:

a process of outputting a video signal from said video camera to the clients which are in access to said video camera;

a process of determining whether a number of the clients which are in access to said video camera is not less than a predetermined number;

a process of controlling said video camera on the basis of the control command from the client; and a process of restraining said video camera from being controlled on the basis of the control command from the client, in accordance with a result of determination provided by said determining process.

29. A storage medium according to claim 28, wherein said video camera is inhibited from being controlled on the basis of the control command from the client, if the number of the clients which are in access to said video camera is not less than the predetermined number.

30. A storage medium according to claim 28, wherein control information for said video camera is further stored in said storage medium, and wherein said program further comprises a process of automatically controlling said video camera on the basis of the control information for said video camera stored in said storage medium, if said video camera is restrained from being controlled on the basis of the control command from the client.

31. A storage medium according to claim 28, wherein said program further comprises a process of permitting said video camera to be controlled by accepting a control command from a specific client even when said video camera is restrained from being controlled on the basis of the control command from the client.

32. A storage medium according to claim 28, wherein said program further comprises a process of shifting a right to control said video camera in sequence to the clients requesting the right to control said video camera.

33. A storage medium according to claim 28, wherein said program further comprises a process of outputting information on a current status of control over said video camera to the clients which are in access to said video camera.

34. A storage medium according to claim 33, wherein the information on the current status of control over said video camera to be outputted includes at least one of information of panning and tilting angles and information of a zoom magnification of said video camera.

* * * * *

UNITED STATES PATENT AND TRADEMARK OFFICE
CERTIFICATE OF CORRECTION

PATENT NO. : 6,239,836 B1
DATED : May 29, 2001
INVENTOR(S) : Kazuko Suzuki et al.

Page 1 of 1

It is certified that error appears in the above-identified patent and that said Letters Patent is hereby corrected as shown below:

<u>Title page,</u>
Item [54], delete "RESTRAIN" and insert -- RESTRAINT --.

<u>Column 1,</u>
Line 7, delete "t o" and insert -- to --.

<u>Column 5,</u>
Line 52, delete "11" and insert -- 1-1 --.

<u>Column 7,</u>
Line 15, delete "S1" and insert -- S11 --.

Signed and Sealed this

Thirtieth Day of April, 2002

Attest:

Attesting Officer

JAMES E. ROGAN
*Director of the United States Patent and Trademark Office*